United States Patent
Ohta

(10) Patent No.: US 8,748,025 B2
(45) Date of Patent: Jun. 10, 2014

(54) CELL HOLDING DEVICE, ASSEMBLED BATTERY, AND VEHICLE

(75) Inventor: Hiroshi Ohta, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 589 days.

(21) Appl. No.: 12/990,534

(22) PCT Filed: Mar. 31, 2009

(86) PCT No.: PCT/IB2009/005127
§ 371 (c)(1),
(2), (4) Date: Nov. 1, 2010

(87) PCT Pub. No.: WO2009/136240
PCT Pub. Date: Nov. 12, 2009

(65) Prior Publication Data
US 2011/0052957 A1      Mar. 3, 2011

(30) Foreign Application Priority Data
May 8, 2008   (JP) ................................ 2008-122289

(51) Int. Cl.
*H01M 2/02*  (2006.01)
*H01M 2/10*  (2006.01)

(52) U.S. Cl.
USPC ............... 429/99; 429/96; 429/152; 429/153; 429/154

(58) Field of Classification Search
USPC ................................... 429/96–100
See application file for complete search history.

(56) References Cited

U.S. PATENT DOCUMENTS

| | | | |
|---|---|---|---|
| 5,718,985 A | * | 2/1998 | Bunyea et al. ................... 429/97 |
| 5,782,654 A | * | 7/1998 | Inazuka et al. ................. 439/500 |
| 6,187,470 B1 | | 2/2001 | Peterson |
| 6,399,238 B1 | * | 6/2002 | Oweis et al. .................... 429/99 |
| 6,627,345 B1 | * | 9/2003 | Zemlok et al. ................... 429/99 |
| 7,175,677 B2 | * | 2/2007 | Miller et al. ................. 29/623.1 |
| 8,409,751 B2 | * | 4/2013 | Suto .............................. 429/177 |

FOREIGN PATENT DOCUMENTS

| | | |
|---|---|---|
| EP | 1 282 188 A1 | 2/2003 |
| EP | 1 808 914 A1 | 7/2007 |
| EP | 1 986 252 A2 | 10/2008 |
| JP | 7-27052 | 5/1995 |
| JP | 2003-77440 | 3/2003 |
| JP | 2003-162993 | 6/2003 |
| JP | 2007-5288 | 1/2007 |

OTHER PUBLICATIONS

International Search Report in International Application No. PCT/IB2009/005127; Mailing Date: Jul. 23, 2009.

* cited by examiner

*Primary Examiner* — Alix Echelmeyer
(74) *Attorney, Agent, or Firm* — Finnegan, Henderson, Farabow, Garrett & Dunner, LLP

(57) ABSTRACT

In a cell holding device, engaging members (224) are disposed in an insertion cavity (222) into which an end portion of each cell (400) is inserted, such that the engaging members (224) are movable in a direction of insertion in which the cell (400) is inserted. The cell holding device also has guides (225) that push the engaging members (224) toward the inner radius of the insertion cavity (222) as the engaging members (224) move in the direction of insertion. With this arrangement, when the end portion of the cell (400) is inserted into the insertion cavity (222), the engaging members (224) sandwiched between the guides (225) and a side circumferential surface (403) of the cell (400) hold the end portion of the cell (400).

18 Claims, 13 Drawing Sheets

CELL HOLDING DEVICE, ASSEMBLED BATTERY, AND VEHICLE

CROSS-REFERENCE TO RELATED APPLICATIONS

This application is a national phase application of International Application No. PCT/IB2009/005127, filed Mar. 31, 2009, and claims the priority of Japanese Application No. 2008-122289, filed May 8, 2008, the contents of both of which are incorporated herein by reference.

BACKGROUND OF THE INVENTION

1. Field of Invention

The invention relates to cell holding devices for holding battery cells, for example, cell holding devices used in assembled batteries (or packed batteries).

2. Description of the Related Art

A number of cells are held in an assembled battery (packed battery). Examples of the structure for holding cells are disclosed in Japanese Utility Model Application Publication No. 7-27052 (JP-U-7-27052) and Japanese Patent Application Publication No. 2003-77440 (JP-A-2003-77440).

A spacer for use in an assembled battery as disclosed in JP-U-7-27052 has notches or recesses formed in the opposite arc-shaped concave surfaces thereof so as to accommodate crimped shoulder portions of cylindrical cells. JP-A-2003-77440 discloses an assembled battery having a number of cylindrical unit cells arranged in parallel with each other within an exterior case made of metal, wherein spaces defined between the outer circumferential surfaces of the unit cells and the inner surface of the exterior case are filled with heat-transfer cement.

The assembled battery in which a plurality of cells are assembled together is installed on a vehicle, such as a hybrid vehicle, to serve as a power supply of the vehicle. When the battery is used as an on-board power supply of the vehicle, it is desired to prevent the cells from rattling due to vibrations during running of the vehicle. Also, since the cells generate heat when they are charged and discharged, the structure for supporting the cells is required to easily dissipate the heat from the cells. It is also desired that the weight of the structure for supporting the cells be reduced so as to improve the fuel economy of the vehicle.

SUMMARY OF THE INVENTION

The invention proposes a totally novel holding structure for holding cells while preventing rattling of the cells.

A cell holding device according to a first aspect of the invention includes an insertion cavity into which an end portion of each cell is inserted, an engaging member disposed in the insertion cavity such that the engaging member is movable in a direction of insertion in which the end portion of the cell is inserted, and a guide that pushes the engaging member toward an inner radius of the insertion cavity as the engaging member moves in the direction of insertion. In the cell holding device, when the end portion of the cell is inserted into the insertion cavity, the engaging member that is sandwiched between the guide and a side circumferential surface of the cell holds the end portion of the cell. The thus constructed cell holding device is able to hold the end portion of the cell that is inserted into the insertion cavity, such that the cell is prevented from rattling when vibrations are applied to the cell.

The guide may be formed on an inner circumferential wall of the insertion cavity, and has a tapered face that is inclined toward the inner radius of the insertion cavity in the direction in which the end portion of the cell is inserted. In this case, the engaging member may be disposed so as to be slidable along the tapered face of the guide. Also, in this case, the engaging member may have a sliding surface at which the engaging member slides along the tapered face, and the sliding surface may be inclined toward the inner radius of the insertion cavity in the direction of insertion, while an angle of inclination of the sliding surface may be substantially equal to that of inclination of the tapered face. Also, the end portion of the cell may be inserted into the insertion cavity in a condition in which the engaging member is mounted on a side circumferential surface of the end portion of the cell, so that the engaging member is disposed in the insertion cavity. Also, the engaging member may include an abutting portion that abuts on an end face of the cell. In this case, when the end portion of the cell is inserted into the insertion cavity, the end face of the cell abuts on the abutting portion of the engaging member, so that the engaging member can be surely or reliably moved in the direction in which the cell is inserted.

A portion of the engaging member which abuts on the side circumferential surface of the end portion of the cell may have a protrusion that protrudes radially inwardly of the insertion cavity. In this case, when the engaging member is sandwiched between the guide and the side circumferential surface of the cell, the protrusion collapses due to deformation of the engaging member, and the resulting reaction force makes it possible to hold the end portion of the cell. The engaging member may have a hollow portion that allows deformation of a portion of the engaging member which abuts on the side circumferential surface of the end portion of the cell. In this case, when the engaging member is sandwiched between the guide and the side circumferential surface of the cell, the engaging member deforms and has the hollow portion collapsed or eliminated, and the resulting reaction force makes it possible to hold the end portion of the cell. A plurality of guides and a plurality of engaging members may be disposed at positions that are spaced apart from each other in a circumferential direction of the insertion cavity. In this case, a ring may be provided for connecting the plurality of engaging members disposed at the positions that are spaced apart from each other in the circumferential direction of the insertion cavity.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF THE EMBODIMENTS

Figure 1:
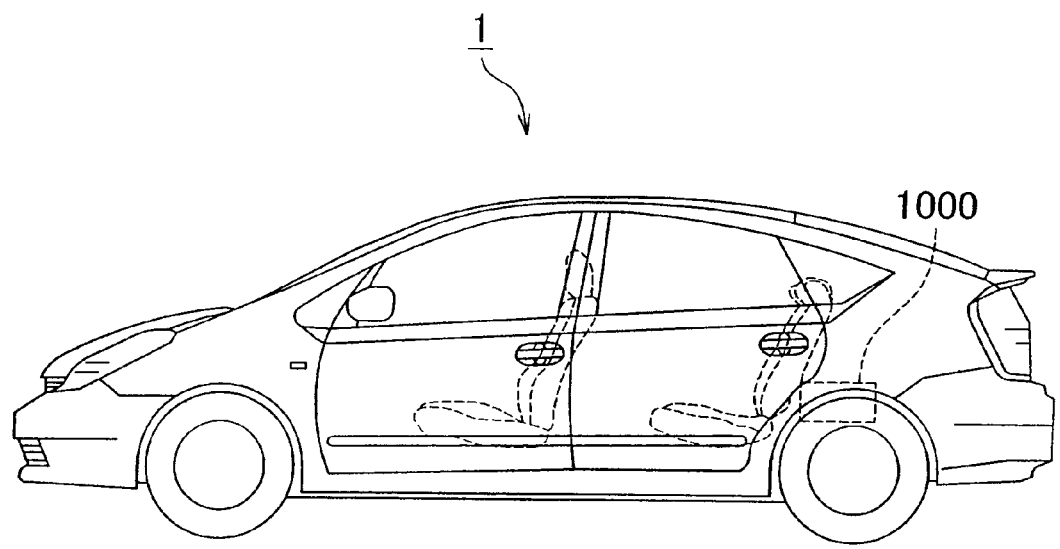
FIG. 1 is a view showing a vehicle on which an assembled battery is installed.

A cell holding device according to one embodiment of the invention will be described with reference to the drawings. In the drawings, the same reference numerals are assigned to members and portions that perform the same functions. In this embodiment, an assembled battery 1000 installed on, for example, a so-called hybrid vehicle 1 as shown in FIG. 1 will be described.

Figure 2:
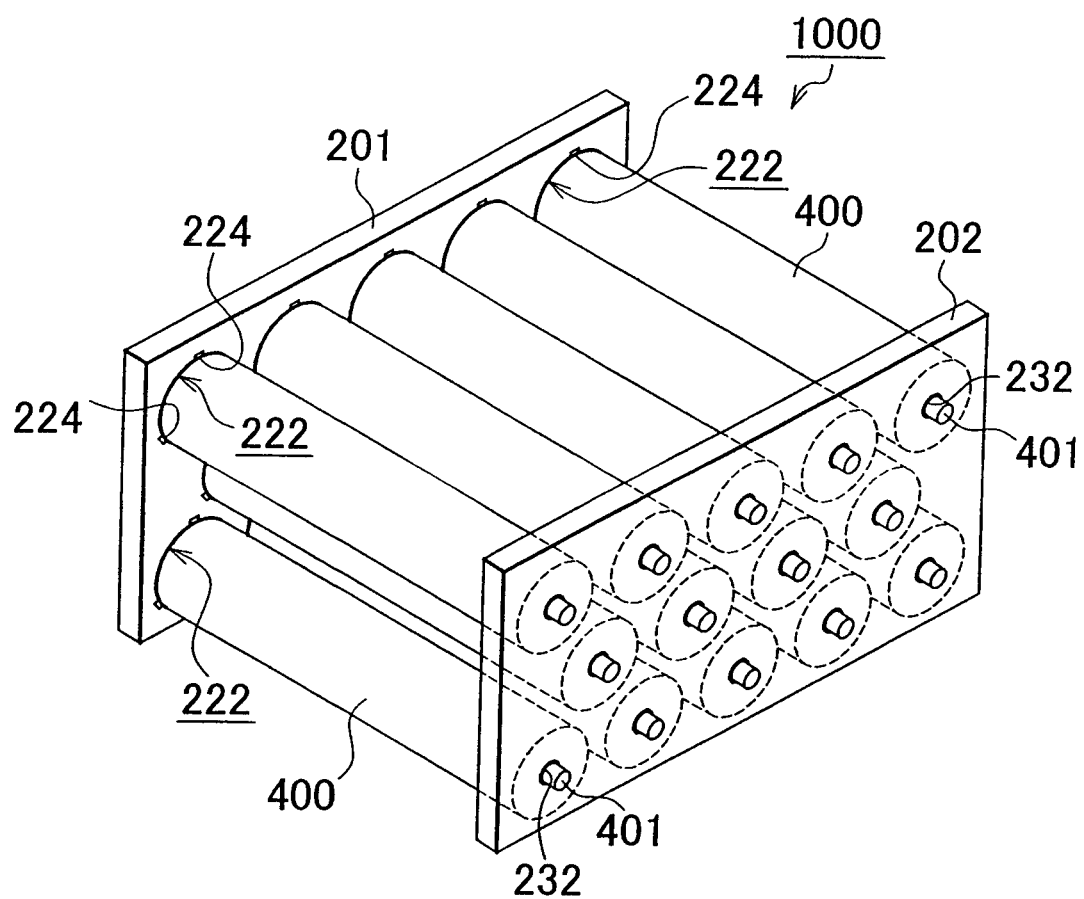
FIG. 2 is a perspective view showing an assembled battery according to one embodiment of the invention.

In this embodiment, the assembled battery 1000 into which a plurality of cylindrical cells 400 are assembled has covers 201, 202 having structures for holding the cells 400, as shown in FIG. 2.

Figure 3:
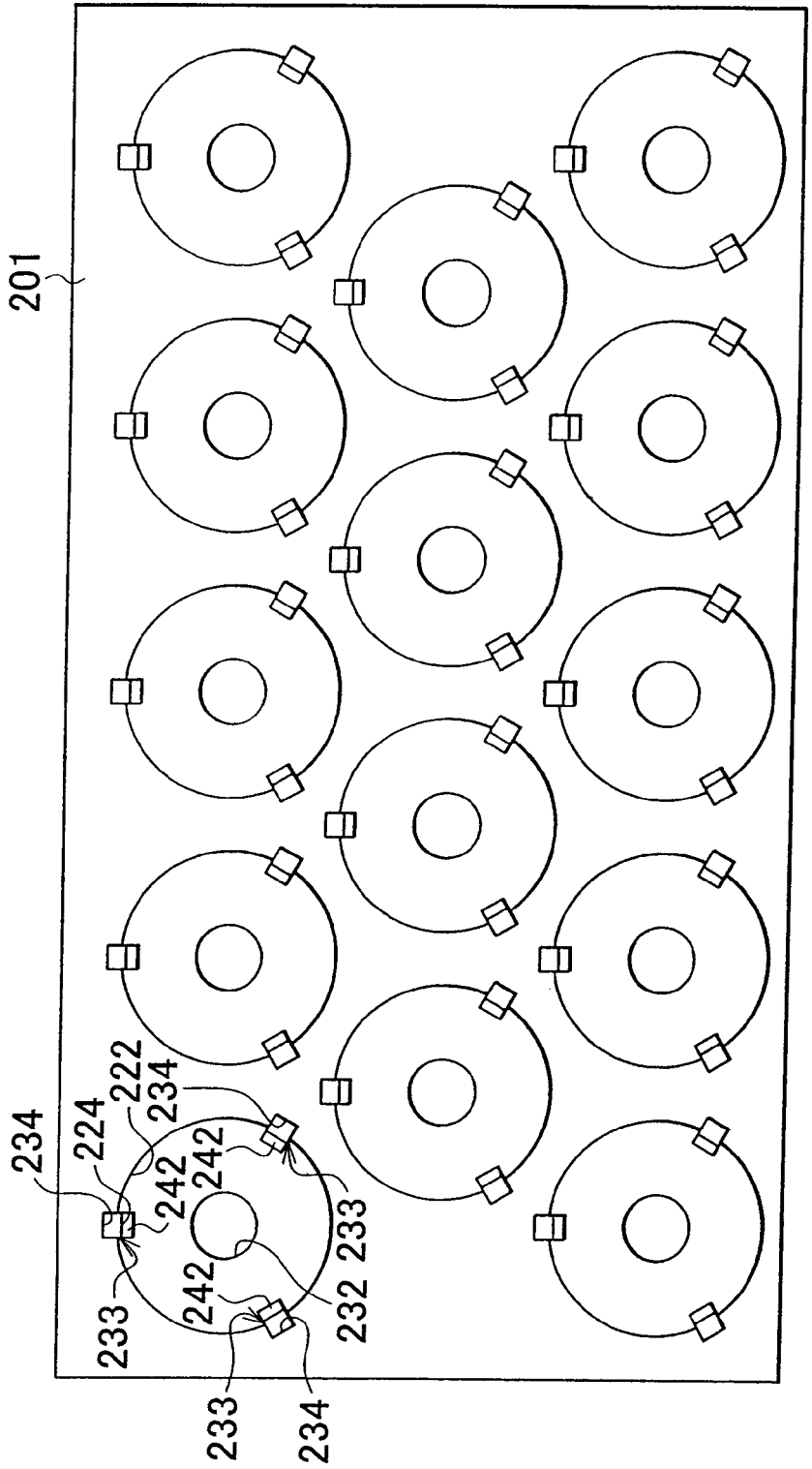
FIG. 3 is a plan view showing a cover of the assembled battery.

In this embodiment, the covers 201, 202 are positioned in the assembled battery 1000 to be opposed to each other. The cylindrical cells 400 are held at their end portions by the covers 201, 202, and are arranged in parallel with each other between the Covers 201, 202. As shown in FIG. 3, insertion cavities 222 into which the end portions of the cylindrical cells 400 are inserted are formed in the opposed faces of the covers 201, 202. In this embodiment, each of the cells 400 inserted into the insertion cavities 222 has a cylindrical shape, and each of the insertion cavities 222 is in the form of a circular hole that is slightly larger in size than the end portion of the cylindrical cell 400. Electrodes 401 protrude from the end faces of the cylindrical cells 400, and through holes 232 through which the electrodes 401 are passed are formed through the bottoms of the respective insertion cavities 222. In this specification, the back-wall side of the insertion cavity 222 at which the through hole 232 is formed will be referred to as "the bottom side of the insertion cavity 222", and the opposite side from which the cell 400 is inserted will be referred to as "the inlet side of the insertion cavity 222".

Figure 4:
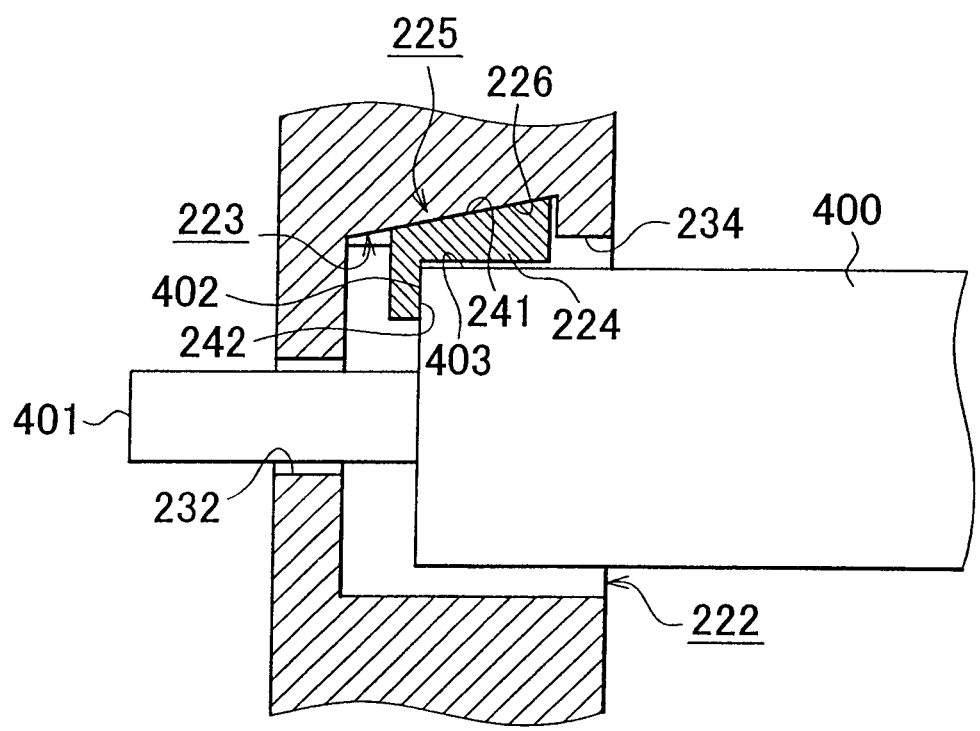
FIG. 4 is a cross-sectional view showing an insertion cavity of a cell holding device according to one embodiment of the invention.
Figure 6:
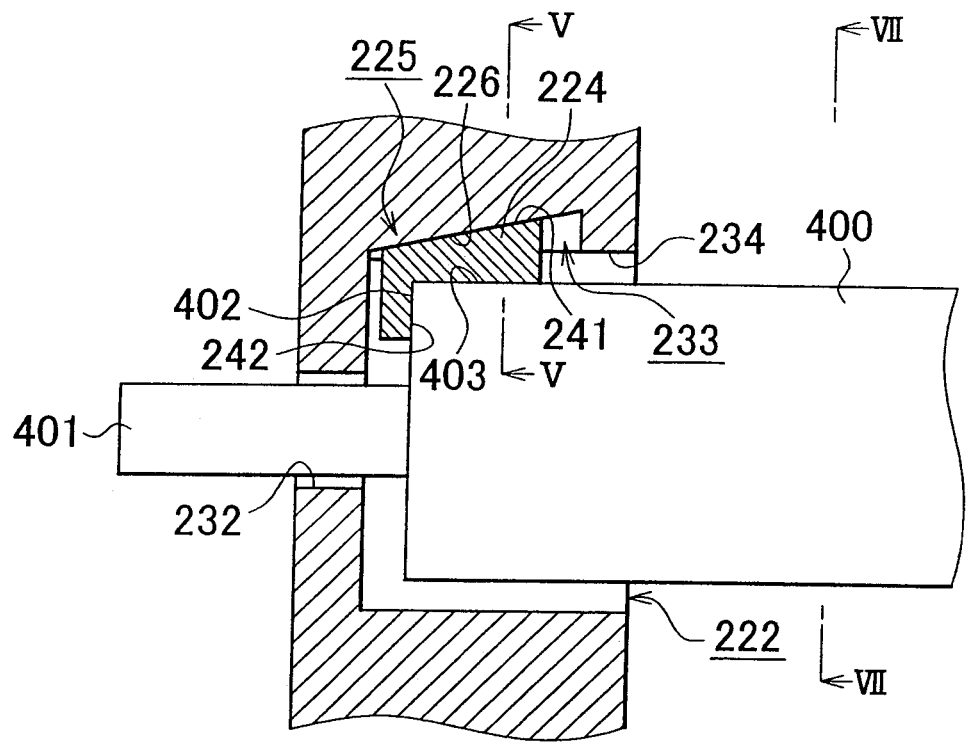
FIG. 6 is a view showing a condition in which an end portion of a cell is inserted in the insertion cavity of the cell holding device according to the above-indicated one embodiment of the invention.

As shown in FIG. 4, an engaging member 224 and a guide 225 are provided in each of the insertion cavities 222. The engaging member 224 is placed in the insertion cavity 222 such that it is movable in a direction in which the end portion of the corresponding cell 400 is inserted. FIG. 4 shows a condition in which the end portion of the cell 400 is not fully pushed into the insertion cavity 222. FIG. 6 shows a condition in which the end portion of the cell 400 has been pushed into the insertion cavity 222 and the engaging member 224 has been moved to the bottom side of the insertion cavity 222. As the engaging member 224 moves in the direction in which the cell 400 is inserted, the engaging member 224 is guided by the guide 225 to be pushed radially inwards, i.e., toward the inner radius of the insertion cavity 222, as shown in FIG. 6. In this embodiment, the guide 225 is formed in the inner circumferential wall of the insertion cavity 222, and has a tapered face 226 that is tapered from the inlet side to the bottom side, i.e., inclined toward the inner radius of the insertion cavity 222. The engaging member 224 is slidable along the tapered face 226.

More specifically, in this embodiment, grooves 233 that extend in the direction in which the cylindrical cell 400 is inserted are formed at three locations that are equally spaced from each other in the circumferential direction of the insertion cavity 222, as shown in FIG. 3. In this embodiment, the engaging members 224 are fitted in the corresponding grooves 233. Stops 234 that prevent the engaging members 224 from coming off are provided at the inlet side of the insertion cavity 222. As shown in FIG. 4, the tapered face 226 of the guide 225 as described above is formed at the bottom of the corresponding groove 233, and is inclined radially inwards in the direction in which the end portion of the cylindrical cell 400 is inserted. In other words, in this embodiment, the groove 233 becomes shallower as it approaches the bottom of the insertion cavity 222.

The engaging member 224 is positioned so as to be slidable on the tapered face 226 (the bottom of the groove 233). In this embodiment, the engaging member 224 is fitted in the above-mentioned groove 233 of the insertion cavity 222, and has a sliding surface 241 that slides along the tapered face 226. The sliding surface 241 of the engaging member 224 is inclined toward the inner radius of the insertion cavity 222 in the direction in which the cell 400 is inserted into the cavity 222. In this embodiment, the sliding surface 241 of the engaging member 224 is formed as an inclined surface that is inclined by the same angle as that of inclination of the tapered face 226 provided in the insertion cavity 222. With this arrangement, the engaging member 224 smoothly slides on the tapered face 226. The taper angle of the tapered face 226 may be set to an appropriate angle in view of the degree of sliding of the engaging member 224, and so forth. The engaging member 224 is fitted in the corresponding groove 233 of the insertion cavity 222, as described above. Although not illustrated in the drawings, the bottom 226 of the groove 233 is slightly wider than the opening thereof, and the engaging member 224 is mounted or fitted in the groove 233 such that it is movable along the groove 233 while being retained so as not to be slipped out of the groove 233.

The engaging member 224 protrudes from the groove 233. When the engaging member 224 moves to the bottom side of the insertion cavity 222, the sliding surface 241 of the engaging member 224 slides along the tapered face 226 (the bottom of the groove 233), and the engaging member 224 is pushed toward the inner radius of the insertion cavity 222. The engaging member 224 has an abutting portion 242 adapted to abut on an end face 402 of the cell 400. The abutting portion 242 protrudes toward the inner radius of the insertion cavity 222.

The engaging member 224 is preferably formed of an easily slidable material having suitable flexibility, so as to achieve good sliding with the tapered face 226 and absorb dimensional errors in the diameter of the cylindrical cell 400 and the inner wall that provides the tapered face 226. As such a material, resin materials, such as PE (polyethylene), PP (polypropylene), PFA (tetrafluoroethylene-perfluoroalkylvinylether copolymer), and PTFE (polytetrafluoroethylene) may be used.

Figure 8:
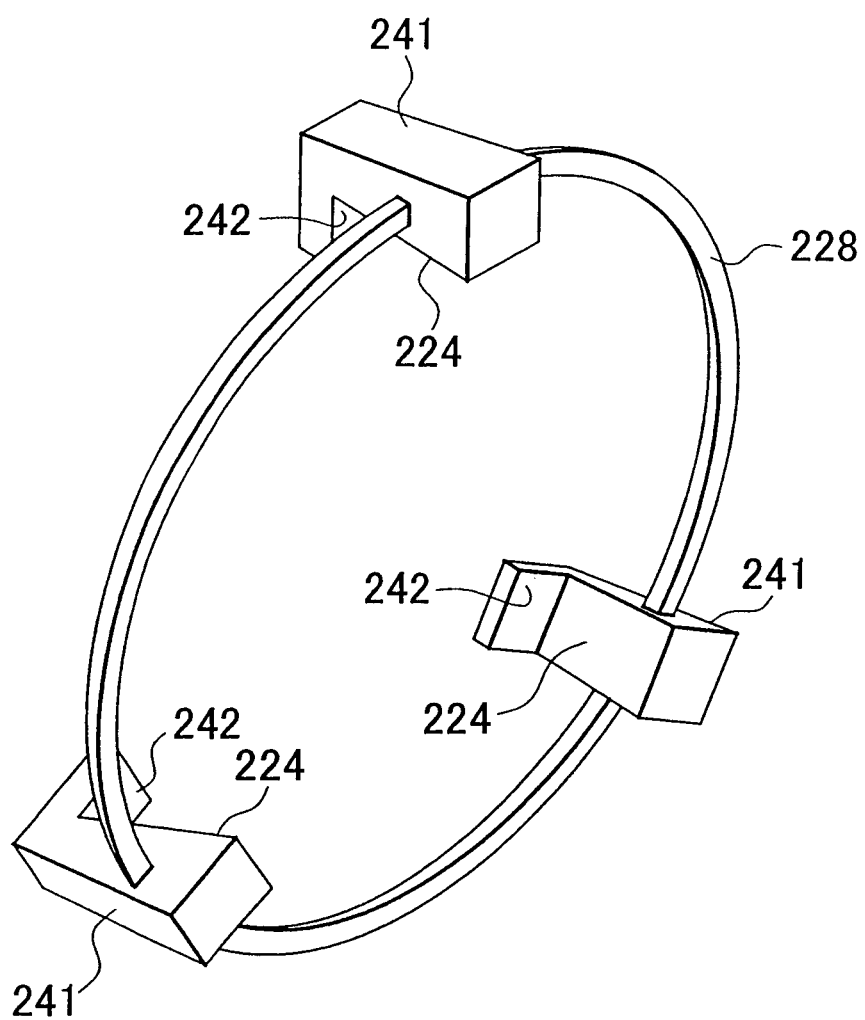
FIG. 8 is a view showing a ring of the cell holding device according to the above-indicated one embodiment of the invention.

In this embodiment, three guides 225 and three engaging members 224 are disposed at positions that are spaced apart from each other in the circumferential direction of each of the insertion cavities 222, as shown in FIG. 3. As shown in FIG. 8, a ring 228 is provided for connecting the three engaging members 224 disposed at positions spaced apart from each other in the circumferential direction of the insertion cavity 222.

Figure 5:
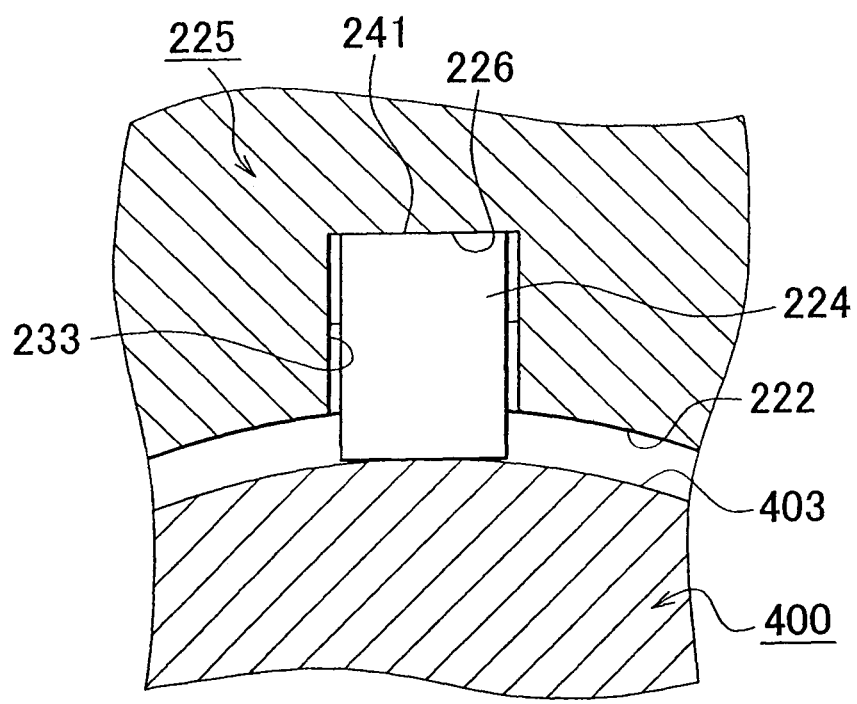
FIG. 5 is a cross-sectional view showing the cross-sectional shape of a groove formed in the insertion cavity of the cell holding device according to the above-indicated one embodiment of the invention.
Figure 7:
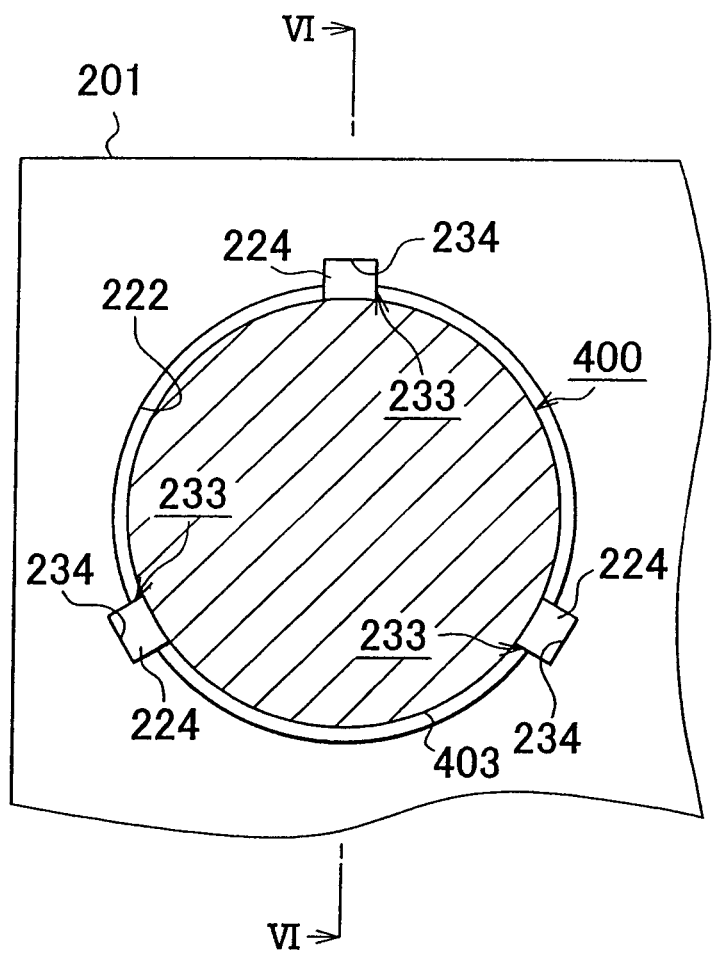
FIG. 7 is a view showing a condition in which the end portion of the cell is held in the insertion cavity of the cell holding device according to the above-indicated one embodiment of the invention.

When the end portion of each cell 400 is inserted into the corresponding insertion cavity 222, as shown in FIG. 6, the engaging members 224 move toward the bottom of the insertion cavity 222 along the guides 225 (tapered faces 226). As shown in FIG. 8, the three engaging members 224 provided in each insertion cavity 222 are connected by the ring 228. The ring 228 serves as a drop-off preventing means for preventing the engaging members 224 from dropping off or coming off when the engaging members 224 are placed on the guides 225 before mounting (or holding) of the cell. (The drop-off preventing means is not limited to the ring as shown in FIG. 8, but may be selected from members of various forms.) The ring 228 also serves to retain or keep the respective engaging members 224 at predetermined positions (at the inlet side of the insertion cavity 222) before mounting of the cell. With this arrangement, the engaging members 224 are prevented from getting into the back of the insertion cavity 222 before mounting of the cell, and from blocking entry of the cell 400 when it is inserted into the insertion cavity 222. Thus, when the end portion of the cell 400 is inserted into the insertion cavity 222 (when the cell is mounted in place), the abutting portion 242 of each of the engaging members 224 is pushed by an end face 402 of the cell 400 so that the engaging member 224 moves to the bottom of the insertion cavity 222, and is sandwiched between the guide 225 (tapered face 226) and a side circumferential surface 403 of the cell 400. As a result, the end portion of the cell 400 is held by the engaging members 224. When the engaging members 224 move along the tapered faces 226, force is applied to the ring 228 in such a direction as to reduce the diameter of the ring 228. Since the ring 228 is arranged to freely deform upon application of the force, the ring 228 does not become an impediment to holding of the cell. FIG. 5 shows a V-V cross section in FIG. 6, more specifically, a cross section of the groove 233 taken in the width direction in a condition where the end portion of the cell 400 is inserted in the insertion cavity 222. FIG. 7 is a VII-VII cross section in FIG. 6, more specifically, a condition where the end portion of the cell 400 is held by the engaging members 224.

Figure 9:
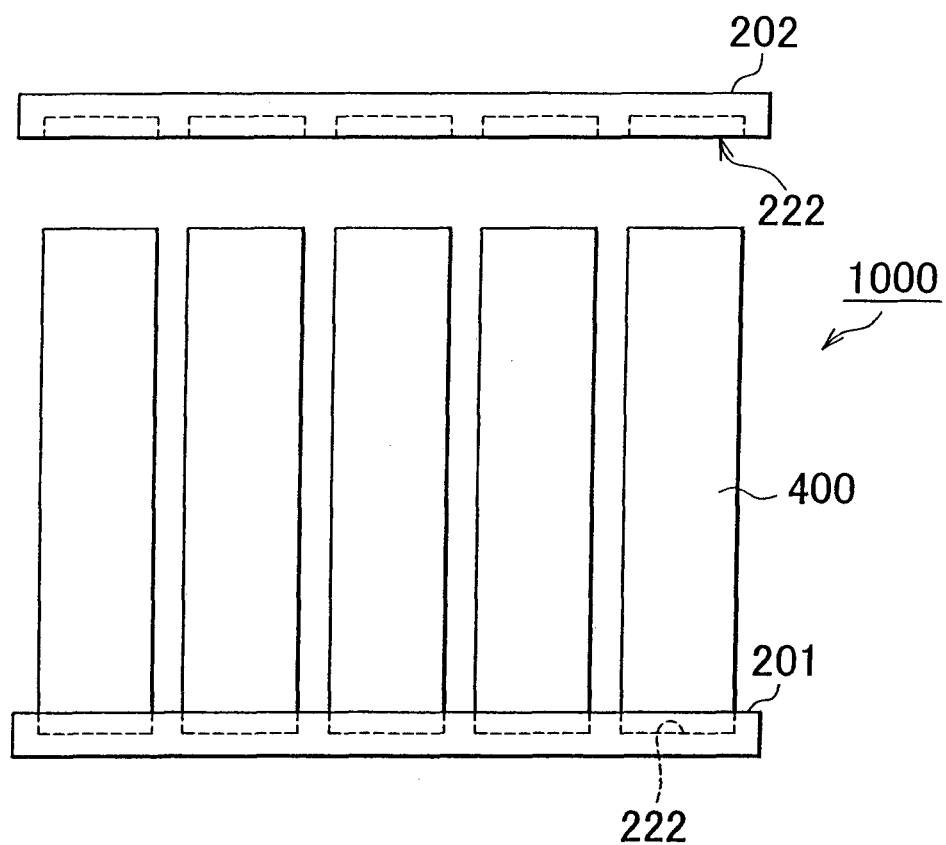
FIG. 9 is a view showing a condition in which the cells are assembled together into the assembled battery according to the above-indicated one embodiment of the invention.

As an exemplary method of producing the assembled battery 1000, one of the covers 201 is placed such that the openings of the insertion cavities 222 face upward, as shown in FIG. 9, and one end portions of the cylindrical cells 400 are inserted into the insertion cavities 222 of the cover 201. Then, the other end portions of the cylindrical cells 400 are inserted into the insertion cavities 222 of the other cover 202, so that the cylindrical cells 400 are mounted between the covers 201, 202. Although not illustrated in the drawings, the assembled battery 1000 may be produced by mounting the cells 400 to the covers 201, 202, as described above, and then fixing the spacing or distance between the covers 201, 202. In this case, as a means for fixing the spacing between the covers 201, 202, spacers, for example, may be disposed between the covers 201, 202, and the spacers may be fastened to the covers 201, 202, respectively, with suitable fastening means, such as bolts.

In this embodiment, the covers 201, 202 serving as the cell holding device are constructed such that the engaging members 224 are placed in the insertion cavities 222 into which the end portions of the cells 400 are inserted, so as to be movable in the direction in which the cells 400 are inserted, as shown in FIG. 6. In each of the insertion cavities 222, the guides 225 are provided for pushing the engaging members 224 toward the inner radius of the insertion cavity 222 as the engaging members 224 move in the direction of the insertion. When the end portions of the cells 400 are inserted in the insertion cavities 222, the covers 201, 202 hold the end portions of the cells 400, by means of the engaging members 224 sandwiched between the guides 225 and the side circumferential surfaces of the cells 400.

With the assembled battery 1000 thus constructed, the opposite ends of the cells 400 are inserted in the insertion cavities 222 of the covers 201, 202, and are firmly held by the engaging members 224. Thus, when the assembled battery 1000 is installed on the vehicle, as shown in FIG. 1, the cells 400 are prevented from rattling when vibrations occur during running of the vehicle. Also, since the covers 201, 202 are arranged to hold the end portions of the cells 400, there are clearances or gaps around the cells 400; therefore, even if the cells 400 generate heat when charged or discharged, the heat is likely to be dissipated, and the performance of the cells is less likely or unlikely to degrade due to the heat. Also, clearances may be provided around the end portions of the cells 400, except for those portions that are held by the engaging members 224, and the clearances can avoid accumulation of heat in the end portions of the cells 400 where the cells 400 are held in position. Also, the cells 400 can be held in position by inserting the end portions of the cells 400 into the insertion cavities 222, thus assuring easiness in the process of mounting the cells 400. Furthermore, the structure for holding the cells may not be so large in size, and the weight of the structure as a whole may be reduced.

While the cell holding device according to one embodiment of the invention has been described, taking the structure for holding the cells 400 of the assembled battery 100 as an example, the cell holding device according to the invention is not limited to the above-described embodiment.

While the cylindrical cells 400 are illustrated by way of example as the cells 400 to be held in the above-described embodiment, the shape of the cells is not limited to the cylindrical shape. For example, the invention may be applied to a structure or device for holding cells housed in rectangular containers. In this case, the cell holding structure may be configured to hold end portions of the rectangular containers, and the insertion cavities may be shaped so that end portions of the rectangular container can be inserted into the cavities.

Figure 10:
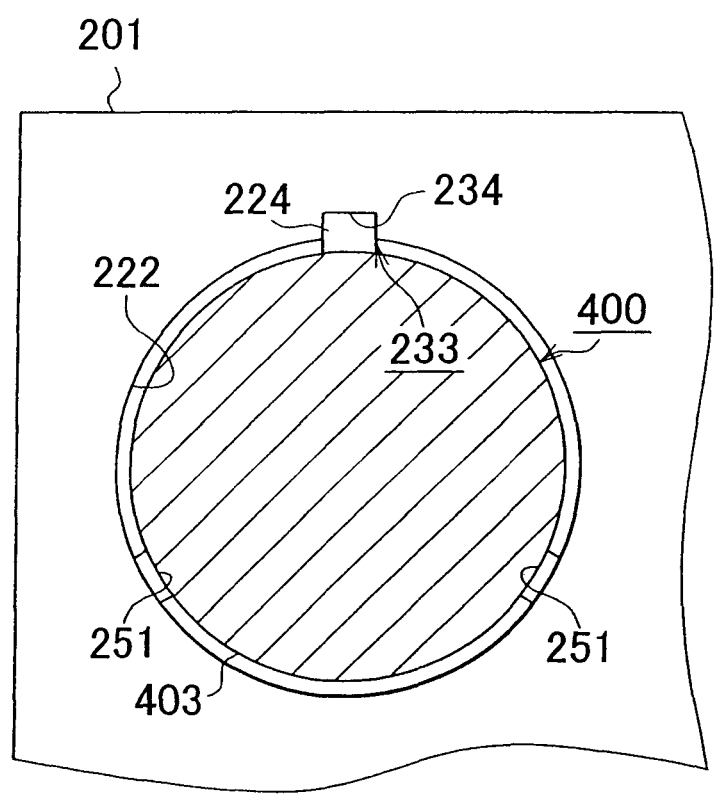
FIG. 10 is a view showing an insertion cavity of a cell holding device according to another embodiment of the invention.

In the above-described embodiment, the engaging members 224 for each cell 400 are mounted at a plurality of (three in the illustrated example) positions that are spaced apart from each other in the circumferential direction of the insertion cavity 222, as shown in FIG. 3. However, the mounting positions of the engaging members 224 and the number of the engaging members 224 mounted in each insertion cavity 222 are not limited to those of the illustrated embodiment, provided that the engaging member(s) 224 is/are able to hold the end portion of the cell 400 inserted in the insertion cavity 222. In an extreme example, the engaging member 224 may be provided at one location as viewed in the circumferential direction of the insertion cavity 222. In this case, the end portion of the cell 400 inserted in the insertion cavity 222 is pushed by the engaging member 224 to be displaced in one direction, and the side circumferential surface 403 of the cell 400 is pressed against the inner circumferential surface of the insertion cavity 222 in the above-indicated one direction, so that the end portion of the cell 400 is held between the engaging member 224 and the inner circumferential surface of the insertion cavity 222. In this case, a cushioning material or materials 251 may be provided on the inner circumferential surface of the insertion cavity 222 at its portion that contacts with the cell 400, as shown in FIG. 10. The cushioning materials 251 may be formed of, for example, a resin material having suitable flexibility, and may be formed of the same material as the engaging member 224.

Figure 11:
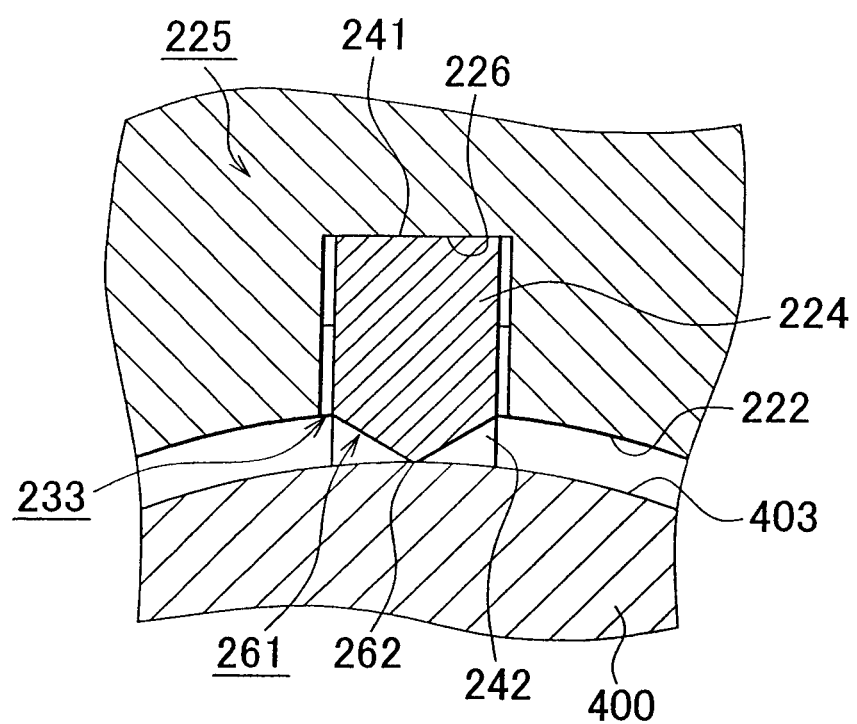
FIG. 11 is a view showing an engaging member of a cell holding device according to a further embodiment of the invention.

In another modified example, each of the engaging members 224 may have a protrusion 261 that protrudes toward the inner radius of the insertion cavity 222 such that the protrusion 261 abuts on the side circumferential surface 403 of the end portion of the cell 400, as shown in FIG. 11. In this case, when the engaging member 224 is pushed radially inwards and pressed against the side circumferential surface 403 of the cell 400, the protrusion 261 of the engaging member 224 is adequately compressed and deformed. As a result, reaction force is applied from the resilient engaging member 224 (protrusion 261) to the end portion of the cell 400, so as to hold the end portion of the cell 400 with appropriate force of constraint.

Figure 12:
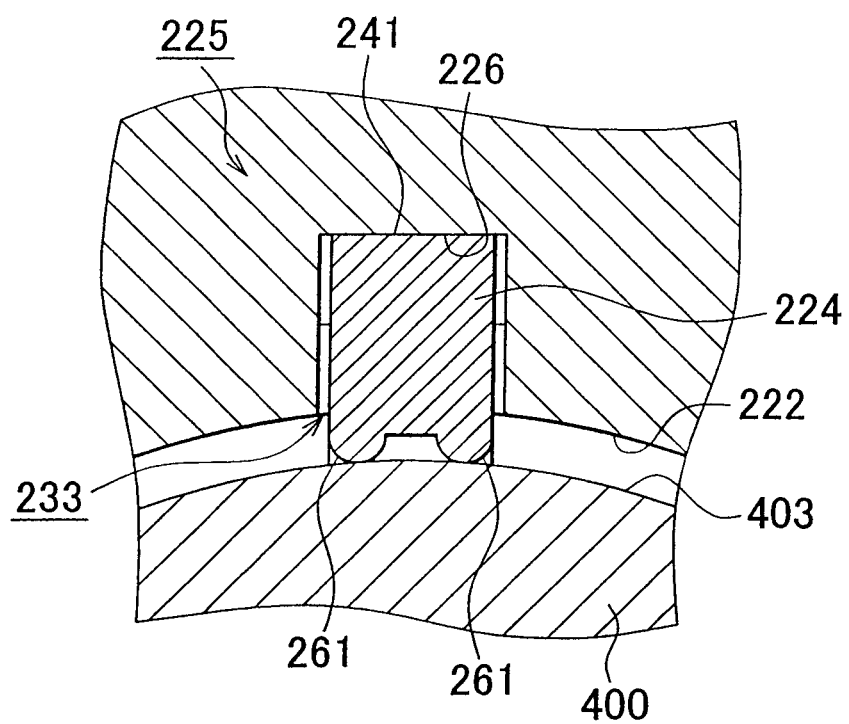
FIG. 12 is a view showing an engaging member of a cell holding device according to a still further embodiment of the invention.

In the above case, the protrusion 261 of the engaging member 224 may have a triangular cross section taken in a plane perpendicular to the direction in which the cell 400 is inserted, as shown in FIG. 11. The protrusion 261 thus shaped includes a circumferentially middle portion 262 that provides the apex of the triangle, at which the protrusion 261 first abuts on the side circumferential surface 403 of the cell 400. In another example, two protrusions 261 may be provided at circumferentially opposite end portions of the engaging member 224, as shown in FIG. 12. In this example, each of the protrusions 261 has a semicircular cross section taken in a plane perpendicular to the direction in which the cell 400 is inserted.

Figure 13:
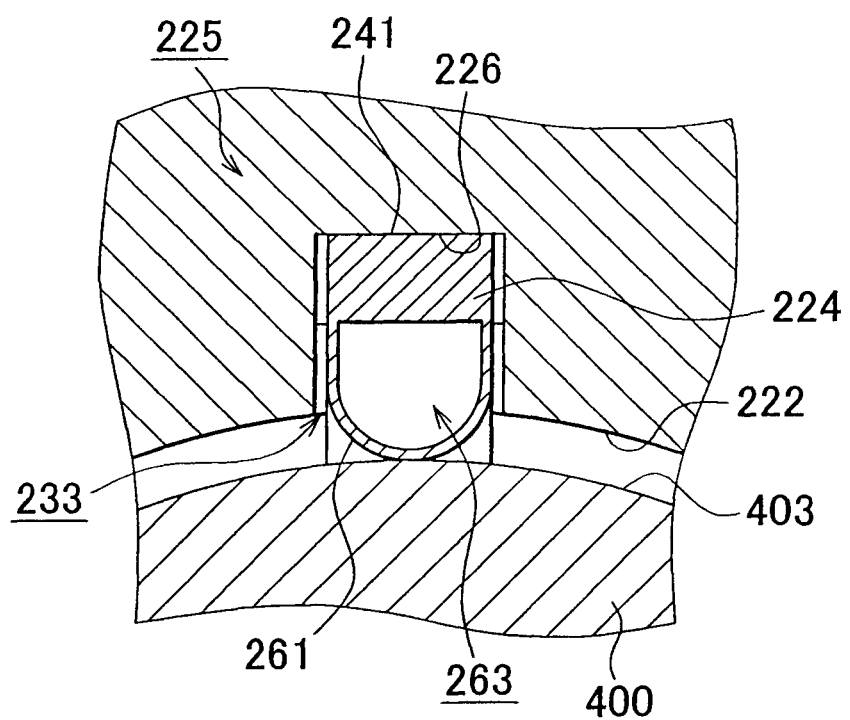
FIG. 13 is a view showing an engaging member of a cell holding device according to another embodiment of the invention.

In a further modified example, the engaging member 224 may have a hollow portion 263 that allows deformation of a portion of the engaging member 224 which abuts on the side circumferential surface 403 of the end portion of the cell 400, as shown in FIG. 13. With the hollow portion 263 thus formed, the engaging member 224 is adequately compressed and deformed when the engaging member 224 is pushed radially inwards and pressed against the side circumferential surface 403 of the cell 400, and the end portion of the cell 400 can be held with appropriate force of constraint, due to reaction force applied from the resilient engaging member 224 to the cell 400.

While the engaging members 224 are placed in the grooves 233 formed in the insertion cavities 222 in the above-described embodiment, the invention is not limited to this arrangement. For example, engaging members may be mounted on the side circumferential surface of the end portion of each cell. In this condition, the end portion of the cell may be inserted into an insertion cavity provided with a guide adapted to push the engaging members, toward the inner radius of the insertion cavity as the engaging members move in the direction in which the end portion of the cell is inserted into the insertion cavity. Even in the case where the engaging members are placed in the insertion cavity in this manner, the engaging members are pushed by the guide toward the inner radius of the insertion cavity when the end portion of the cell is inserted into the insertion cavity. It is thus possible to hold the end portion of the cell, by means of the engaging members sandwiched between the guide and the side circumferential surface of the cell. Thus, the cells can be held in position so as not to rattle when vibrations occur during running of the vehicle.

The structure of the assembled battery is not limited to the structure as described above. The battery cells to be held by the cell holding device of the invention may be, for example, lithium-ion secondary cells, nickel-metal hydride cells, nickel-cadmium cells, or the like.

The assembled battery utilizing the cell holding device of the invention for holding cells may be favorably used as a power supply for a motor (electric motor) installed on a vehicle 1, such as an automobile, as schematically shown in FIG. 1. More specifically, the assembled battery may be suitably used as a power supply (secondary battery) for an electric motor of an automobile, such as a hybrid car, electric car, or a fuel cell car.

The invention claimed is:

1. A cell holding device for holding end portions of cells of a battery, comprising:
   an insertion cavity into which the end portion of each of the cells is inserted;
   an engaging member disposed in the insertion cavity such that the engaging member is movable in a direction of insertion in which the end portion of the cell is inserted, wherein the engaging member includes an abutting portion that abuts on an end face of the cell; and
   a guide that pushes the engaging member toward an inner radius of the insertion cavity as the engaging member moves in the direction of insertion, wherein:
   the engaging member is fitted in a groove formed as a concave portion on an inner circumferential surface of the insertion cavity, and the guide includes a tapered face formed at the bottom of the groove, and
   when the end portion of the cell is inserted into the insertion cavity,
      the engaging member that is sandwiched between the guide and a side circumferential surface of the cell holds the end portion of the cell, and
      the abutting portion is pushed by the end face of the cell so that the engaging member moves to a bottom of the insertion cavity to be sandwiched between the tapered face and the side circumferential surface of the cell.

2. The cell holding device according to claim 1, wherein:
   the guide is formed on the inner circumferential surface of the insertion cavity;
   the tapered face is inclined toward the inner radius of the insertion cavity in the direction in which the end portion of the cell is inserted; and
   the engaging member is slidable along the tapered face of the guide.

3. The cell holding device according to claim 2, wherein the engaging member has a sliding surface at which the engaging member slides along the tapered face, and the sliding surface is inclined toward the inner radius of the insertion cavity in the direction of insertion, while an angle of inclination of the sliding surface is substantially equal to that of inclination of the tapered face.

4. The cell holding device according to claim 1, wherein the end portion of the cell is inserted into the insertion cavity in a condition in which the engaging member is mounted on a side circumferential surface of the end portion of the cell, so that the engaging member is disposed in the insertion cavity.

5. The cell holding device according to claim 1, wherein a portion of the engaging member which abuts on the side circumferential surface of the end portion of the cell has a protrusion that protrudes radially inwardly of the insertion cavity.

6. The cell holding device according to claim 1, wherein the engaging member has a hollow portion that allows deformation of a portion of the engaging member which abuts on the side circumferential surface of the end portion of the cell.

7. The cell holding device according to claim 1, wherein a plurality of guides each comprising said guide and a plurality of engaging members each comprising said engaging member are disposed at positions that are spaced apart from each other in a circumferential direction of the insertion cavity.

8. The cell holding device according to claim 7, further comprising a ring that connects said plurality of engaging members disposed at the positions that are spaced apart from each other in the circumferential direction of the insertion cavity.

9. The cell holding device according to claim 8, wherein the ring is configured such that a diameter of the ring is reduced when the plurality of engaging members move along the tapered faces of the plurality of guides.

10. The cell holding device according to claim 1, wherein force applied to the engaging member increases as the engaging member moves in the direction of insertion.

11. The cell holding device according to claim 1, wherein the engaging member is formed of a resin material.

12. The cell holding device according to claim 1, further comprising a cushioning material provided on a portion of the inner circumferential surface of the insertion cavity in which the guide is not formed.

13. An assembled battery in which a plurality of cells are held by the cell holding device as defined in claim 1.

14. The assembled battery according to claim 13, wherein a pair of cell holding devices each comprising said cell holding device are provided, and opposite ends of said plurality of cells are respectively held by said pair of cell holding devices.

15. A vehicle on which the assembled battery as defined in claim 13 is installed as a power supply.

16. The cell holding device according to claim 1, wherein the insertion cavity includes a bottom side and an inlet side opposite the bottom side, wherein the groove extends between the bottom side and the inlet side and becomes shallower approaching the bottom side.

17. The cell holding device according to claim 16, further comprising a stop disposed at the inlet side.

18. The cell holding device according to claim 1, wherein the engaging member protrudes from the groove.

* * * * *